United States Patent
MacDougall

(10) Patent No.: US 11,630,633 B1
(45) Date of Patent: Apr. 18, 2023

(54) COLLABORATIVE SYSTEM BETWEEN A STREAMER AND A REMOTE COLLABORATOR

(71) Applicant: Promp, Inc., Milton (CA)

(72) Inventor: Francis MacDougall, Milton (CA)

(73) Assignee: PROMP, INC., Milton (CA)

( * ) Notice: Subject to any disclaimer, the term of this patent is extended or adjusted under 35 U.S.C. 154(b) by 0 days.

(21) Appl. No.: 17/852,532

(22) Filed: Jun. 29, 2022

Related U.S. Application Data

(60) Provisional application No. 63/328,704, filed on Apr. 7, 2022.

(51) Int. Cl.
| | |
|---|---|
| *G06F 3/0482* | (2013.01) |
| *G06F 3/0488* | (2022.01) |
| *G06T 19/00* | (2011.01) |
| *G06F 3/14* | (2006.01) |
| *G06F 3/01* | (2006.01) |
| *G06F 3/147* | (2006.01) |

(52) U.S. Cl.
CPC ............ *G06F 3/1454* (2013.01); *G06F 3/011* (2013.01); *G06F 3/147* (2013.01)

(58) Field of Classification Search
CPC ......... G06F 3/1454; G06F 3/011; G06F 3/147
See application file for complete search history.

(56) References Cited

U.S. PATENT DOCUMENTS

| | | | |
|---|---|---|---|
| 9,047,698 B2 * | 6/2015 | Maciocci | G06F 3/167 |
| 9,081,473 B2 | 7/2015 | Nordstrom et al. | |
| 9,142,062 B2 * | 9/2015 | Maciocci | G06T 19/006 |
| 9,196,067 B1 * | 11/2015 | Freed | G01S 17/66 |
| 9,384,594 B2 * | 7/2016 | Maciocci | G06T 19/006 |
| 10,966,684 B2 * | 4/2021 | Daoura | A61B 8/467 |
| 11,200,742 B1 | 12/2021 | Post et al. | |
| 11,288,871 B2 * | 3/2022 | Kim | G06T 19/20 |
| 2012/0249416 A1 * | 10/2012 | Maciocci | G06F 3/011 |
| | | | 345/156 |
| 2012/0249544 A1 * | 10/2012 | Maciocci | G06F 3/147 |
| | | | 345/419 |

(Continued)

FOREIGN PATENT DOCUMENTS

CN 106062862 B * 4/2020 ............. G01B 11/14

OTHER PUBLICATIONS

Huang et al., Sharing hand gesture and sketch cues in remote collaboration, 2018 (Year: 2018).*

(Continued)

*Primary Examiner* — Jordany Nunez
(74) *Attorney, Agent, or Firm* — Fish & Richardson P.C.

(57) ABSTRACT

A method for interactive collaboration between a streamer user and a remote collaborator. The method includes receiving, by a collaborator computing device, streaming images taken by a streamer computing device. A collaborator user interface is generated and provided for output by the collaborator device. The collaborator user interface includes the received images. Hand tracking data is received by the collaborator device. The collaborator user interface is updated to include a representation of the hand tracking data and the received images. The hand tracking data is transmitted by the collaborator device to the streamer device for inclusion on a streamer user interface that is generated and provided for output by the streamer device.

20 Claims, 10 Drawing Sheets

(56) References Cited

U.S. PATENT DOCUMENTS

| | | | | |
|---|---|---|---|---|
| 2012/0249590 | A1* | 10/2012 | Maciocci | G06F 3/167 |
| | | | | 345/633 |
| 2012/0249591 | A1* | 10/2012 | Maciocci | G06F 3/167 |
| | | | | 345/633 |
| 2012/0249741 | A1* | 10/2012 | Maciocci | G06T 19/006 |
| | | | | 348/51 |
| 2015/0123966 | A1* | 5/2015 | Newman | G06T 19/006 |
| | | | | 345/419 |
| 2016/0358383 | A1* | 12/2016 | Gauglitz | G06F 3/0304 |
| 2018/0324229 | A1* | 11/2018 | Ross | G06F 3/1423 |
| 2019/0129607 | A1* | 5/2019 | Saurabh | G06F 3/011 |
| 2019/0361694 | A1 | 11/2019 | Gordon et al. | |
| 2020/0394012 | A1* | 12/2020 | Wright, Jr. | G06K 9/6201 |
| 2021/0142568 | A1* | 5/2021 | Kim | G06F 3/011 |

OTHER PUBLICATIONS

Kirk et al., "Turn it This way: Grounding Collaborative Action with Remote Gestures", Apr. 28, 2007 (Year: 2007).*

Huang et al., "Handsin3D: supporting remote guidance with immersive virtual environments", 2013 (Year: 2013).*

Huang et al., HandsInAir: A Wearable System for Remote Collaboration, 2013 (Year: 2013).*

Amores et al., "ShowME: A Remote Collaboration System that Supports Immersive Gestural Communication", 2015 (Year: 2015).*

Alem et al., "Remote Tele-Asistance Systems for Maintenance Operations in Mines", 2011 (Year: 2011).*

Seo et al., "Webizing Collaborative Interaction Space for Cross Reality with Various Human Interface Devices", 2018 (Year: 2018).*

Yout et al., "Hybrid Intertial and Vision Tracking for Augmented Reality Registration", 1999 (Year: 1999).*

* cited by examiner

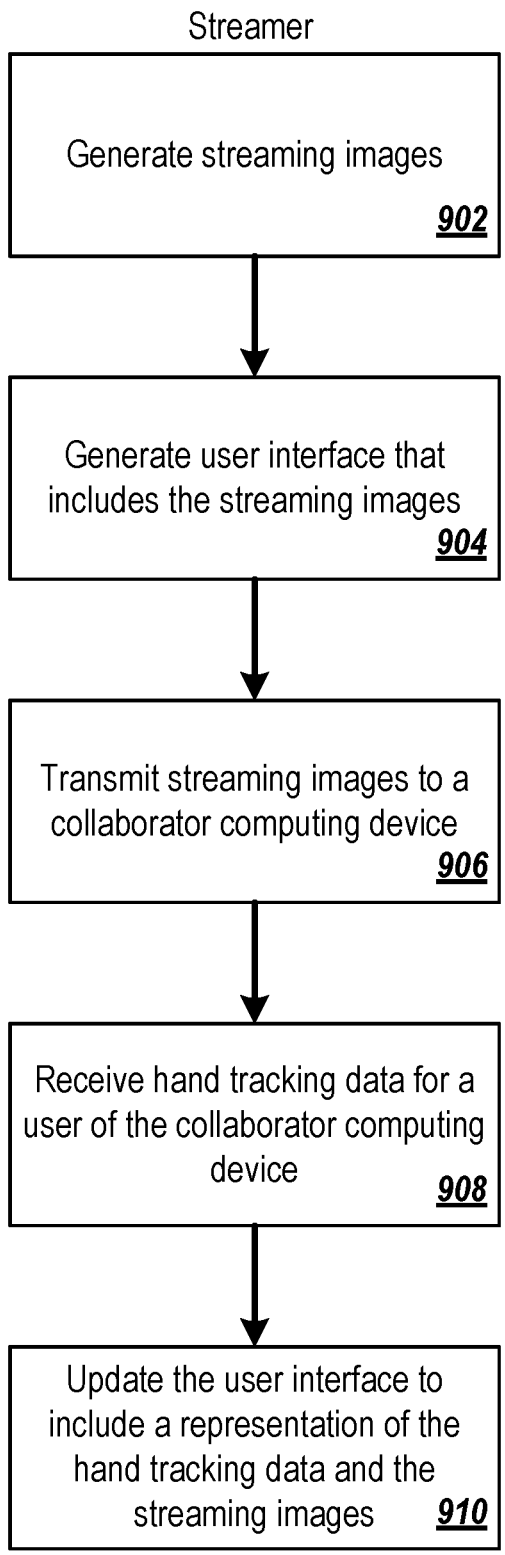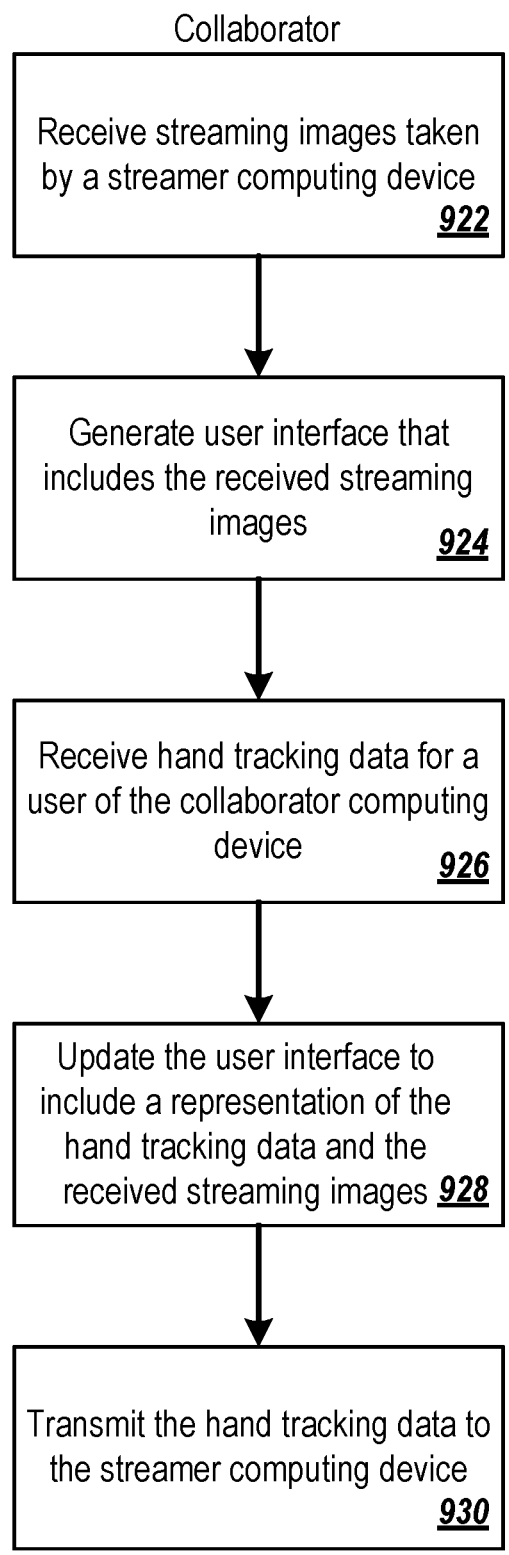
FIG. 9A
FIG. 9B

COLLABORATIVE SYSTEM BETWEEN A STREAMER AND A REMOTE COLLABORATOR

CLAIM OF PRIORITY

This application claims priority under 35 USC § 120 to U.S. Patent Application Ser. No. 63/328,704 filed on Apr. 7, 2022, titled "Collaborative System Between A Streamer And A Remote Collaborator"; of which the entire contents are hereby incorporated by reference.

FIELD

This specification generally relates to virtual reality systems.

BACKGROUND

Hand tracking devices can detect and capture hand pose and position information of one or more hands of a user. The hand tracking device can generate hand pose and position information for a user's hand that is in a tracking area of the hand tracking device. A hand tracking device can be a standalone unit or can be included as part of another device, such as a virtual reality device.

SUMMARY

This specification generally describes a collaborative system between a streamer user and a remote collaborator user.

A first user, who can be referred to as a "streamer," can use a handheld device (e.g., mobile phone), head mounted device (e.g., augmented reality headset), or other device (e.g., computer, laptop, tablet, etc.) that includes a camera. The streamer device can be connected to a network, stream audio/video over the network, render 3D (three-dimensional) graphics over a local view and receive data, audio and optionally video over that network.

A second user, who can be referred to as a "collaborator," can use a device (e.g., handheld, head mounted, or other device) that is connected to a network and that can receive the streamer's video content over the network and display the streamer's video content on the collaborator's device. The collaborator device can include or be connected to a local microphone and a camera. The collaborator device can include or be connected to a hand tracking device or software that can provide detailed hand pose information. The collaborator device can render 3D graphics on a local display of the collaborator device. The collaborator device can transmit data, audio, and video content over the network.

The streamer device can stream an audio/video feed to the collaborator device. The streamer's video feed can be displayed on the collaborator's device. The collaborator can reach their hand(s) into a local hand tracking device's tracking area and view a representation of their hand(s) rendered in 3D graphics superimposed on the streamer's video feed on the local display of the collaborator device. Additionally, the hand tracking data and other control information can be sent to the streamer device.

The streamer device can receive, from the collaborator device, hand tracking data and other control information and can render representation(s) of the collaborator's hand(s) on a local display of the streamer device in 3D so that the hand representation(s) appear superimposed on a local view of the streamer. The streamer device can also receive audio and optionally video from the collaborator device. The streamer can use the streamer device to communicate with the collaborator.

Accordingly, the streamer user and the collaborator user can both view the representations of collaborator's hand(s) superimposed on the streamer's video content or view. The collaborator user can point at a specific location in the streamer's view and cause that location to be highlighted for the streamer by performing a "clicking" or selection action using, for example, a "finger tap" or other motion with their index finger on a location within the streamer's view using their tracked hand(s). Location information for the highlighted position can be transmitted over a network to the streamer device. The location information can be used by the streamer device and the collaborator device to render a hi-light graphical effect on both the streamer's view and on the collaborator's view, respectively. The streamer user and the collaborator user can communicate using audio and/or video streams sent from both sides of the collaboration.

BRIEF DESCRIPTION OF THE DRAWINGS

FIG. 9A is a flowchart of an example method for collaboration between a streamer computing device and a collaborator computing device.

FIG. 9B is a flowchart of an example method for collaboration between a collaborator computing device and a streamer computing device.

DETAILED DESCRIPTION

Figure 1A:
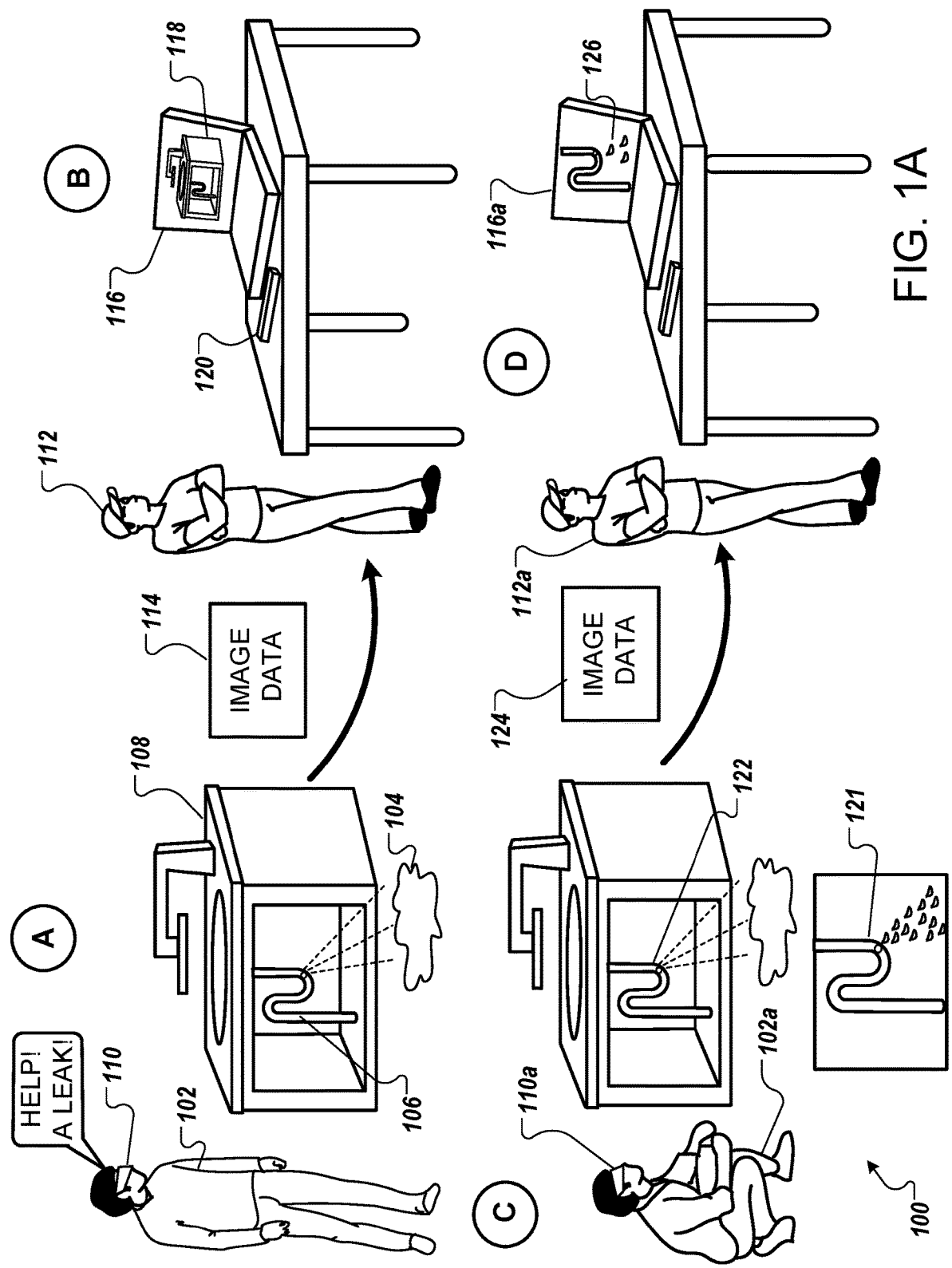
FIGS. 1A-1B are diagrams that illustrate an example scenario between a streamer user and a collaborator user.
Figure 1B:
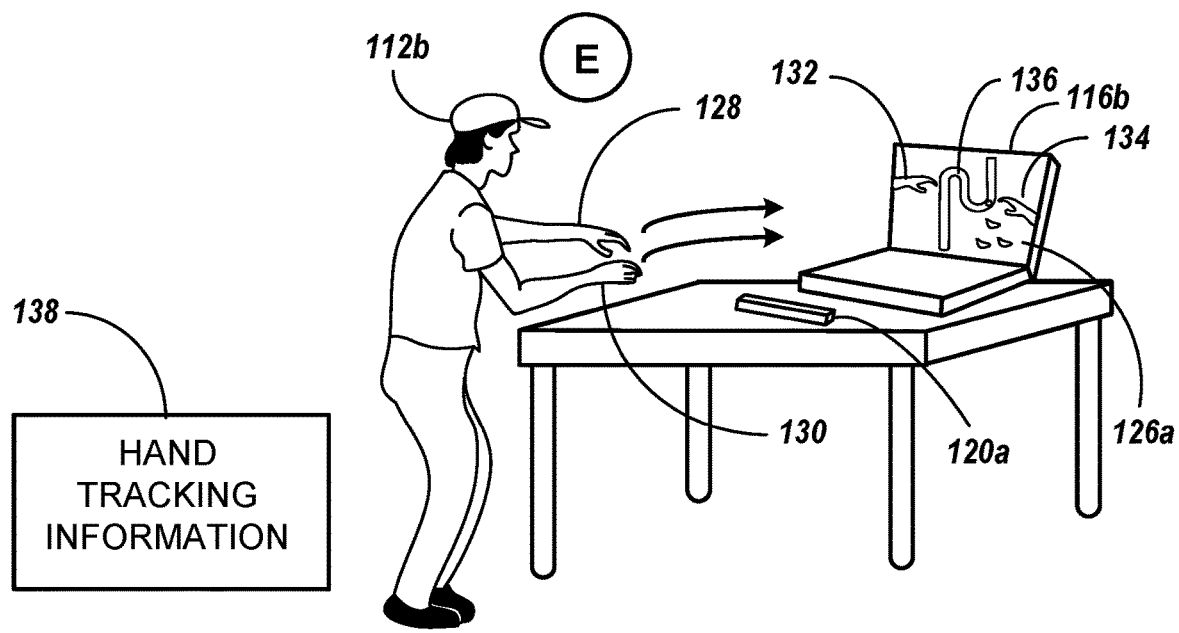
Figure 1B:
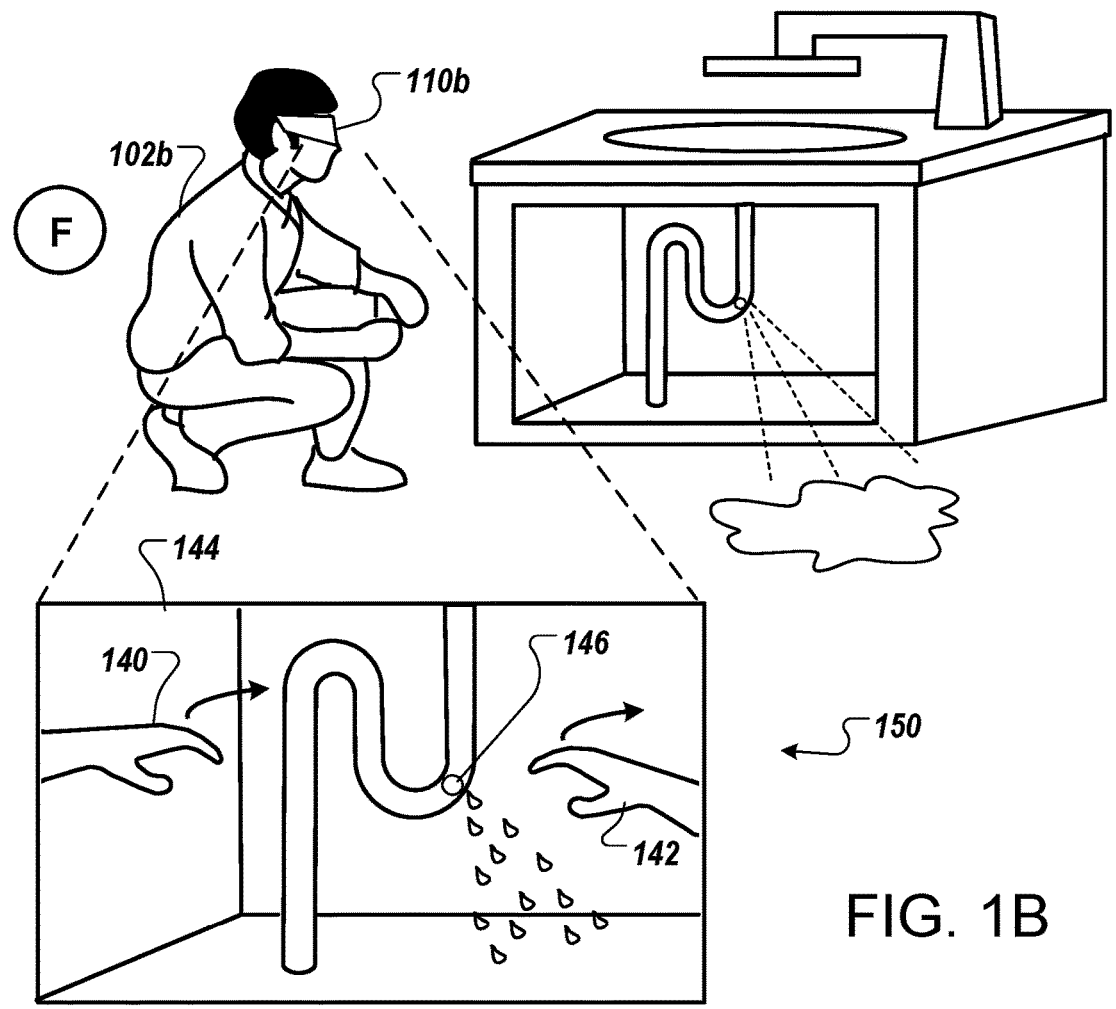

FIGS. 1A-1B are diagrams 100 and 150, respectively, that illustrate an example scenario between a streamer user and a collaborator user. In a stage "A", a user 102 notices they have a plumbing leak 104 in a pipe 106 under a bathroom sink 108. The user 102 does not know how to fix the leak. The user 102 is subscribed to a collaboration service where they can get help from a collaborator, e.g. a licensed plumber, that is remote from the user 102. The user 102 can use different types of devices to connect to the collaborator/collaboration service, such as a mobile device or a virtual reality (VR) headset 110. The user can request assistance from a remote collaborator once connected to the collaboration service. The user can request connection to a particular collaborator or the collaboration service can connect the user 102 to a particular collaborator. For example, the user 102 or the collaboration service can select a collaborator 112. For instance, the collaborator 112 may be a plumber.

Once the user 102 and the collaborator 112 are connected using the collaboration service, the VR headset 110 can stream image (e.g., video) data 114 to a device of the collaborator 112, so that the collaborator 112 can see a video view of the environment of the user 102 as viewed through the VR headset 110. In other examples below, the user 102 may be referred to as a streamer or a streamer user.

In a stage "B", a computing device 116 of the collaborator 112 receives, over a network, the image data 114 that is being streamed by the VR headset 110. The computing device 116 can receive the image data 114 from the VR headset using peer to peer streaming or indirectly from a streaming server. The computing device 116 can render displayed video content 118 on a display of the computing device 116 in response to receiving the image data 114. The computing device 116 is connected to a hand tracking device 120 that can capture hand and pose information of the collaborator 112.

In a stage "C", the user 102 (shown as a user 102a), after being connected to the collaborator 112, looks under the sink so that a view 121 of the VR headset 110 (shown as a VR headset 110a) includes video of a leaking pipe 122. The VR headset 110a (or an intermediary server) continues to stream image/video data (e.g., image data 124) to the collaborator device 116.

For example, in a stage "D", the collaborator device 116 (shown as a collaborator device 116a) displays video content 126 that corresponds to content shown in the view 121). Accordingly, the collaborator 112 (e.g., a collaborator 112a) can see, on the collaborator device 116a, a view of the environment of the user 102a, as captured by the VR headset 110a. That is, the collaborator 112a can see the leaking pipe on a display of the collaborator device 116a.

As shown in FIGS. 1B and 1n a stage "E", the collaborator 112 (shown as a collaborator 112b) moves into a tracking area of the hand tracking device 120 (shown as a hand tracking device 120a). The hand tracking device 120a can capture hand position and pose information of hands 128 and 130 of the collaborator 112b. The collaborator device 116 (shown as a collaborator device 116b) can display, on top of the video content 126 (e.g., video content 126a), virtual hand representations 132 and 134 that correspond to the hands 128 and 130 of the collaborator 112b, respectively. The collaborator 112b can move their hands 128 and 130 so that the hand representations 132 and 134 appear, on top of the video content 126a, near an image of a pipe joint 136 that the collaborator 112b believes is a source of the pipe leak. The collaborator 112b can rotate their hands 128 and 130 in a clockwise fashion (which can cause the corresponding respective hand representations 132 and 134 to also rotate in a clockwise fashion) to demonstrate a recommended "righty-tighty" (e.g., wrench) tightening operation for the user 102. The collaborator device 116b (or in some cases the hand tracker 120a) can send hand tracking information 138 to the VR headset 110 of the user 102.

For example, in a stage "F", a VR headset 110b of the user 102 (e.g., a user 102b) can receive the hand tracking information 138. In response to receiving the hand tracking information 138, the VR headset 110b can render hand representations 140 and 142, that correspond to the collaborator hands 128 and 130 and to the hand representations 132 and 134, respectively, on a view 144 of the VR headset 110b. Updated hand tracking information 138 can be repeatedly sent from the collaborator device 116b to the VR headset 110b. Accordingly, as the collaborator 112b moves their hands 128 and 130, the hand representations 140 and 142 can move accordingly within the view 144. For example, the view 144 can display the hand representations 140 and 142 moving towards an image of a pipe joint 146) and rotating in a clockwise manner (e.g., as a demonstration of the recommended wrench tightening operation).

Figure 2:
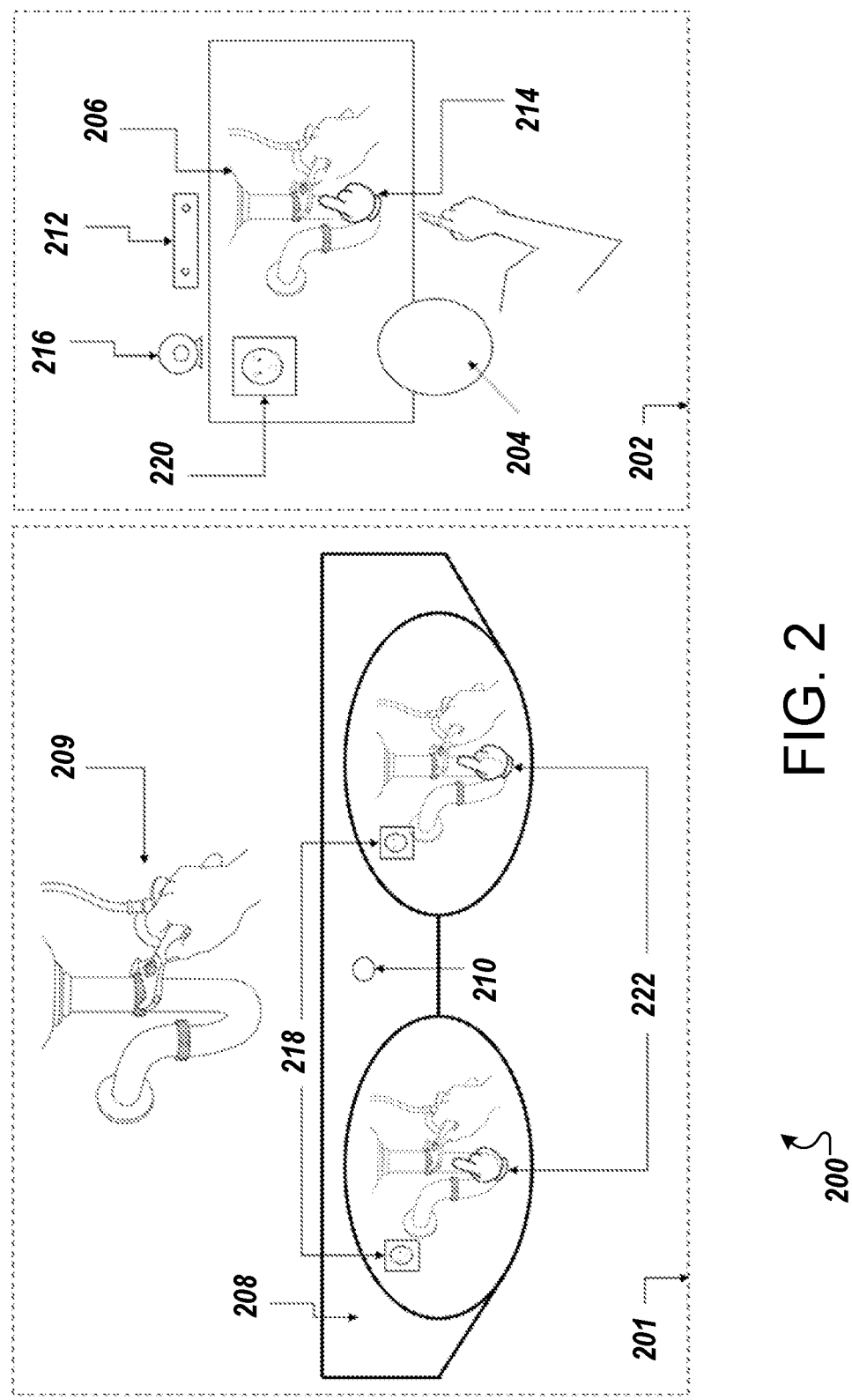
FIG. 2 is an example of an exemplary system for providing remote support incorporating hand tracking using an augmented reality headset.

FIG. 2 is an example of an exemplary system 200 for providing remote support incorporating hand tracking using an augmented reality headset. The example system includes a streamer system 201 and a collaborator system 202. A collaborator 204 sits in front of a display 206 that shows streaming video content receive from a streamer who is wearing an augmented reality headset 208. Streaming audio and video (e.g., of a scene 209) can be captured by one or more cameras and microphones 210 on the augmented reality headset 208 and can be streamed to the collaborator system 202. The collaborator 204 can use a hand tracking device 212 that can generate detailed hand and finger pose information that can be used to enable the collaborator 204 to control a rendered hand 214 on the collaborator's display 206 that is showing the streamer's view. The collaborator system 202 can include a camera and microphone 216. Audio/video data captured by the camera and microphone 216 can be streamed to the streamer's headset 208, to enable the streamer to hear and optionally see video 218 of the collaborator 204 during the support session. Video content captured by the camera and microphone 216 can also be played on the display 206 (e.g. as shown by a video 220). The collaborator's system 202 can take data captured by the hand tracking device 212 and transmit the captured data to the remote streamer's headset 208. The headset 208 can render a representation 222 of the collaborator's hand pose and position directly on a view of the streamer's headset 208.

Figure 3:
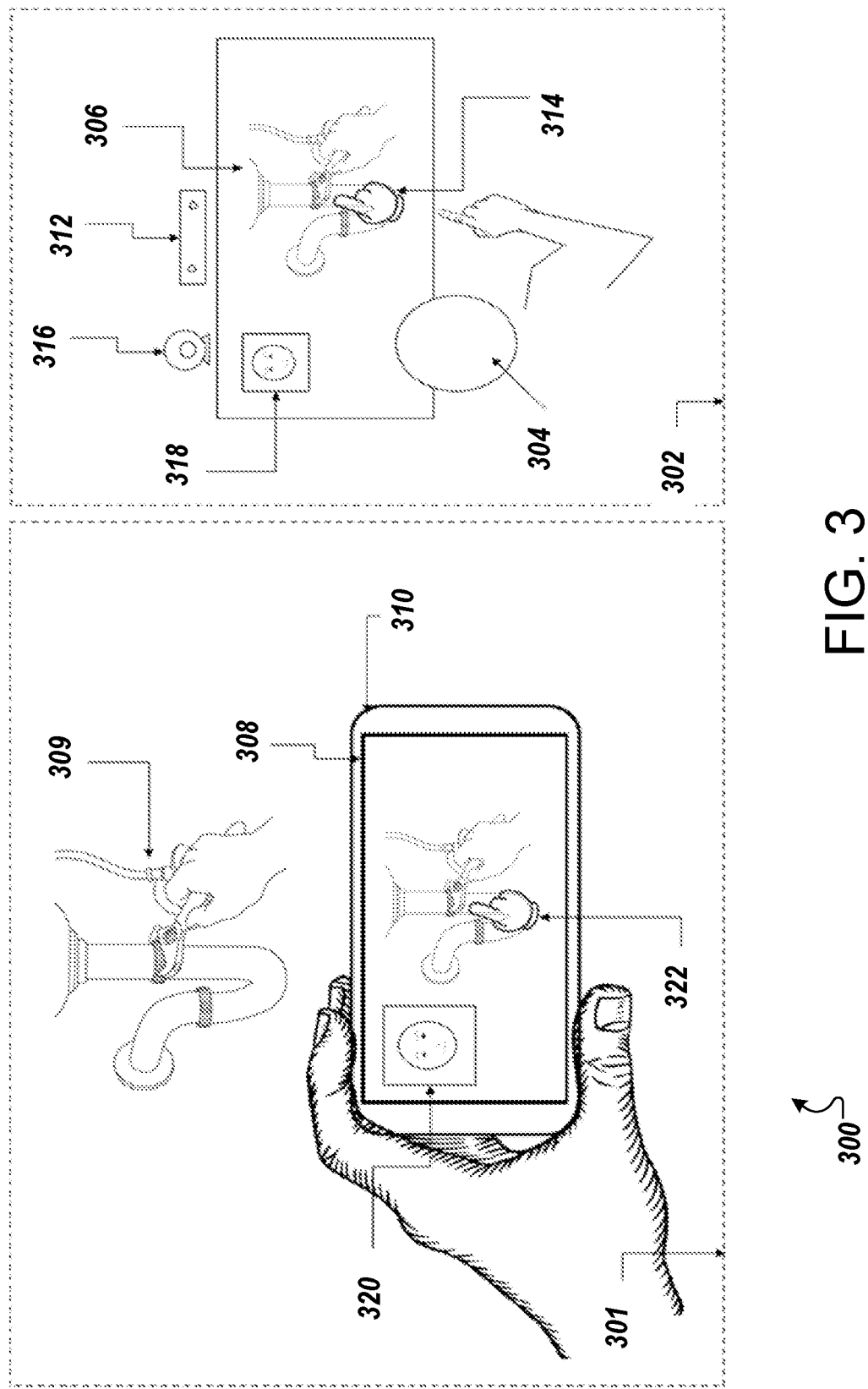
FIG. 3 illustrates an example of an exemplary system for providing support incorporating hand tracking using a mobile device.

FIG. 3 illustrates an example of an exemplary system 300 for providing support incorporating hand tracking using a mobile device. The example system includes a streamer system 301 and a collaborator system 302. A collaborator 304 sits in front of a display 306 that shows streaming content received from a streamer's mobile device 308. Streaming audio and video (e.g., of a scene 309) can be captured by one or more cameras and microphones 310 on the mobile device 308 and can be streamed to the collaborator system 302. The collaborator 304 can use a hand tracking device 312 that can generate detailed hand and finger pose information of the collaborator 304. The detailed hand and finger pose information can be used by the collaborator system 302 to enable the collaborator 304 to control a rendered hand 314 on the collaborator's display 306 of the streamer's view. The collaborator 304 can also use a camera and microphone 316 that can capture audio/ video data of the collaborator 304. Video 318 of video content captured by the camera and microphone 316 can be shown on the display 306. The captured audio/video data of the collaborator 304 can also be streamed to the streamer's mobile device 308 to enable the streamer to hear and optionally see video 320 of the collaborator during a support session. The collaborator's system 302 can transmit the captured hand and finger poste information to the streamer's mobile device 308. The mobile device 308 can render a virtual representation 322 of the collaborator's hand pose and position directly on the screen of the streamer's mobile device 308.

Figure 4:
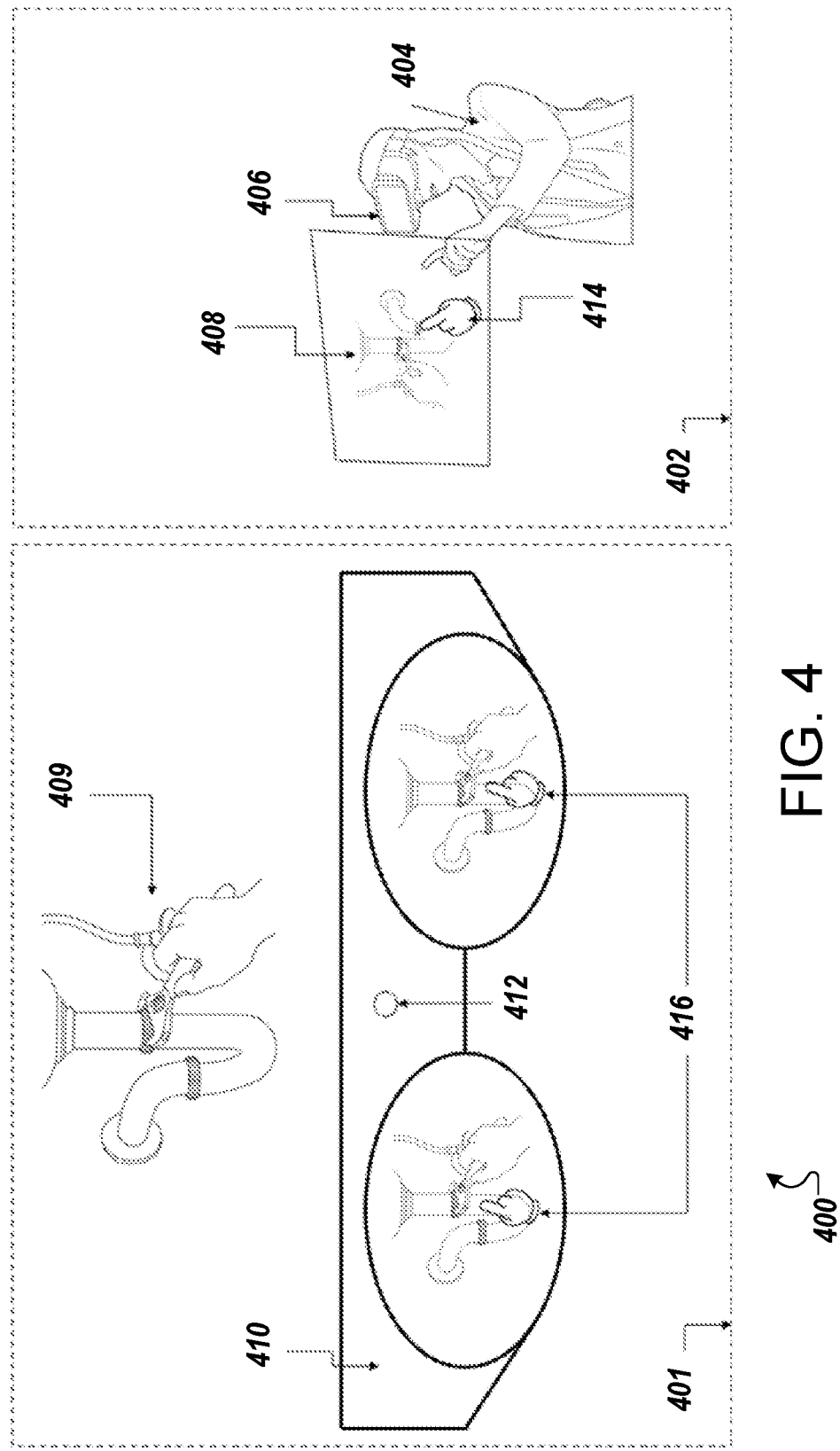
FIG. 4 is an example of an exemplary system for providing remote support incorporating hand tracking using an augmented reality headset of a streamer user.

FIG. 4 is an example of an exemplary system 400 for providing remote support incorporating hand tracking using an augmented reality headset of a streamer user. The system 400 includes a streamer system 401 and a collaborator system 402. The collaborator system 402 includes a collaborator 404 wearing a virtual reality headset 406 that incorporates hand tracking functionality. The virtual reality headset 406 displays a streaming video view 408 of a scene 409 in the streamer's environment. Streaming video content of the scene 409 can be received by the virtual reality headset 406 from an augmented reality headset 410 of the streamer (or from a network-connected device that is connected to the augmented reality headset 410). Audio and video for the scene 409 can be captured by one or more cameras and microphones 412 on the augmented reality headset 410 and can be streamed to the collaborator's virtual reality headset 406. A hand tracking device of the collaborator's virtual reality headset 406 can generate detailed hand and finger pose information of the collaborator 404. The virtual reality headset 406 can use the detailed hand and finger pose information to enable the collaborator 404 to control a rendered hand 414 rendered on the video view 408 on the display of the virtual reality headset 406. The collaborator's virtual reality headset 406 can also have a microphone that can capture audio data of the collaborator 404. The audio of the collaborator can be streamed from the virtual reality headset 406 (or from a network-connected device that is connected to the virtual reality headset 406) to the streamer's headset 410, to enable the streamer to hear the collaborator 404 during a support session. The collaborator system 402 can transmit the detailed hand and pose information of the collaborator to the streamer's augmented reality headset 410. The augmented reality headset 410 can render a representation 416 of the collaborator's hand, hand pose, and position directly on a view of the streamer's augmented reality headset 410. In other examples, the streamer can be using a mobile phone or other augmented reality device instead of the augmented reality headset 410.

Figure 5:
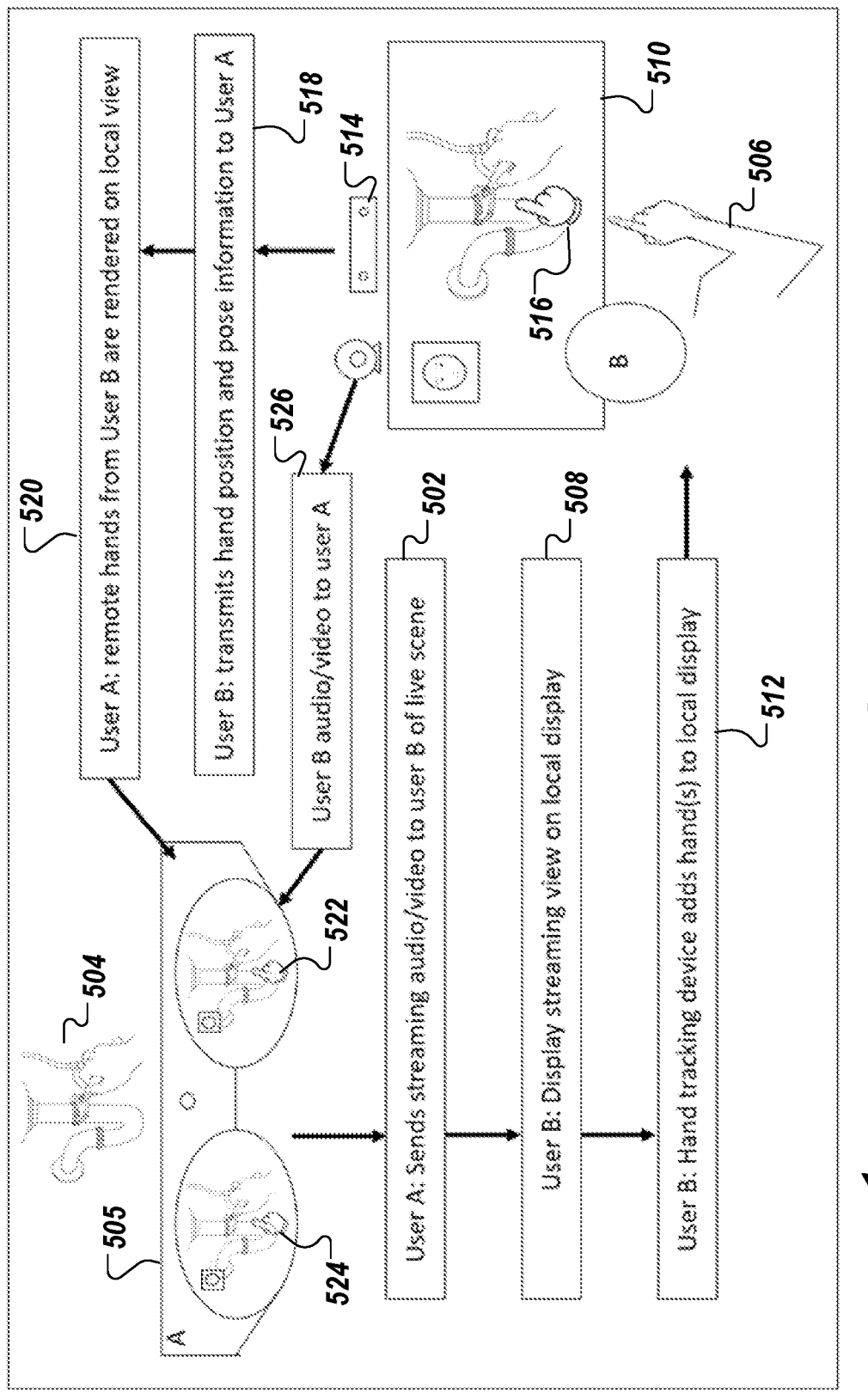
FIG. 5 illustrates a flowchart of an example collaborative process.

FIG. 5 illustrates a flowchart of an example collaborative process 500. The collaborative process 500 can be between a user A (e.g., a streamer) and a user B (e.g., a collaborator). The user A can be at a location that is remote from a location of the user B.

At 502, streaming audio/video content of a live scene 504 that is captured by a device 505 of the user A is sent to a device of the user B 506.

At 508, the device of the user B displays a streaming view of the live scene 504 on a local display 510 of the device of the user B.

At 512, a hand tracking device 514 captures hand pose and position information for a hand of the user B 506 and a virtual representation 516 of a tracked hand is displayed on the display 510.

At 518, the device of the user B transmits hand position and pose information for the hand of the user B to the device 505 of the user A.

At 520, the device 505 of the user A uses the received hand position and pose information to render virtual hands 522 and 524 on a local view seen by the user A.

At 526, the device of the user B optionally transmits audio and/or video to the device 505 of the user A, to enable the user A to see and/or hear the user B.

In addition or alternatively to a single-collaborator/single-streamer use case, the system can support various other types of streamer/collaborator combinations and use cases. For instance, the system can support one-streamer/multiple-collaborators use cases. For example, the system can support sessions such as a medical procedure where more than one consulting surgeon may be present. In general, the system can support various types of collaborative scenarios where multiple collaborators are present, where each collaborator can have their virtual hand(s) displayed as overlaying a streamer's video content. The system can style or render the hands of a particular collaborator using a color for the rendered hand that matches a frame around the video of that person on screen, or by supplying each collaborator with their own customized avatar hand that would uniquely identify each collaborator. As another example, an identity marker or image for each user can be added to respective virtual hands. When different virtual hands of different collaborators are rendered, the system may render the different virtual hands by having the different virtual hands appear to come from different directions relative to the streamer. For example, the system can render different virtual hands from different directions to portray a scenario of the streaming having colleagues at their left and right shoulders where each collaborator can virtually reach into a scene from different directions. To accomplish different collaborator hands appearing to come from different directions, the initial transformation of the hand position on each collaborator's view can be used to match corresponding collaborator and streamer views.

As another example, the system can also support one-collaborator/multiple-streamers use cases. For example, the system can be used for education environments where a teacher may be working with a collection of students. In general, for any scenario where a single collaborator may be aiding multiple streamers, multiple streams can be displayed on a single collaborator display adjacent to one another or in a grid formation such as a video conference gallery so that the single collaborator can watch multiple streamers simultaneously. If a specific streamer needs the collaborator's input, the collaborator can virtually reach into that streamer's stream, and by bringing focus to that stream, possibly with a finger tap, the collaborator can interact as if they are in a one-on-one collaborator/streamer session with that particular streamer. The selected stream of that streamer can be optionally enlarged on the collaborator display after being selected and the voice of the collaborator can be dynamically muted on the other streams if desired.

In addition to scenarios where streamer cameras are looking in front of respective users' devices at their respective environments, the system can support other use cases for scenarios where streamer cameras are pointing at respective streamers (e.g., where respective streamers are using a laptop, tablet, or mobile device) such as in a typical video conferencing scenario. For example, the system can support different types of training scenarios where a trainer (e.g., collaborator) performs an action that multiple streamers are trying to replicate. With the system configured with streamer cameras pointed at respective streamers, the trainer can view the performance of each streamer on respective streamer subscreens. For example, the system can support a video-conference-based yoga class, where the trainer is able to remotely coach any student by virtually reaching into a student's video feed and showing the student what to change using the trainer's remote hands overlaid on the student's video. Dynamic muting of the trainer voice on other student streams can be performed. As with other types of scenarios, the collaborator can perform these actions using any device setup that provides both display and hand tracking capability.

Other supported use cases can include multiple-camera teaching scenarios, such as a golfing training system where two cameras are setup at 90 degrees to each other providing two views of a same area. In this scenario, two streams from a single streamer can be connected to a single collaborator and the collaborator can virtually interact with both streams with their hands to highlight different areas for the student captured from the different cameras. The system can also support a capability to record sequences of video from both streams and allow the collaborator to replay those streams to the student.

The system can also support various types of multiple-streamers/multiple-collaborators use cases. For example, for the golf training system with two cameras, the system can enable more than one collaborator to make comments and virtually interact with the different streams using their hands. In general, various other types of multiple-streamer/multiple-collaborator scenarios can be supported, including, for example, use cases for games and group activities. For instance, for a training session such as a remote yoga class, the system can enable additional collaborators providing one on one direction to individual streamers while a main collaborator continues the training of the group. The system, for example, can enable multiple collaborators to make selections or actions across a group of streamers which can enable various types of interactive remote experiences.

In some examples, the system can support streaming a desktop as the streamer view. For instance, for education and other use cases, the system can enable the streaming of a student's desktop (or mobile phone screen) to a collaborator as a view that can be interacted with by the collaborator. This would allow a teacher (or teachers) to monitor a group of students working on an application concurrently and allow a teacher's virtual hands to be displayed on any student's screen as reaching into the application space to help the student along if needed. A combination of desktop streaming with audio/video streaming of each streamer can be used for full communication between a student and the teacher.

In some use cases, streamers can also be collaborators. For example, the system can support scenarios that involve a collection of streamers who also have collaborator capability (e.g., where streamers have hand tracking on a device that is streaming content). In such scenarios, multiple streamer devices can be sending each other streamer their view to respective other streamer devices and any streamer can virtually interact with any other streamer's stream.

The system can support various other training and data applications. For example, a hand tracking data stream combined with video content can support various approaches for categorizing and analyzing how individuals work with one another using the system. Similar to how telegraph operators can be recognized by their unique rhythms, the ability to recognize individuals through their hand motions can be enabled and can have a variety of applications. For instance, over time, it may be possible, through use of the system, to recognize anger management issues and other characteristics of individuals from their hand motions. It may also be possible, through use of the system, to categorize individuals with specific nerve or muscle damage in their hands and to use such information as a diagnostic tool. For certain actions that require specific hand techniques such as surgery, sports, art, and many other activities, recorded hand motions can provide an excellent source for training and for training evaluation. For coaching applications such as the described golf or yoga examples, the interactions of a coach coupled with the underlying videos can provide a great source of data to eventually create virtual coaches based on past interactions.

In some cases, a mouse or keyboard or other input can also (or alternatively) be used to trigger display of a highlighted location on the collaborator and streamer displays. In other implementations, a hybrid approach can be used that includes the collaborator pressing a space bar or other key to trigger highlighting a location where a rendered fingertip of the collaborator's index finger is currently located within the streamer's view. If the camera of the streamer is moving when a highlight input occurs, different approaches of localized image tracking can be used to maintain a rendered highlight on an originally selected location within the streamer's view. For example, one method can be "patch" tracking that includes taking a sample of image data in an area around a highlight point, determining a closest match in subsequent images, and moving a highlight point to remain in a patch location within the video stream.

In some implementations, the collaborator can "freeze" the video content of the streamer to allow more detailed interaction or discussion between the streamer and the collaborator. For example, the collaborator can use a hand gesture or a keyboard, voice, or other input to trigger freezing of the streamer's video content. For example, if the collaborator holds their hand with all fingers extended in a "stop" gesture then the system can interpret that gesture as a freeze request. As another example, a different hand pose can be used to trigger a video freeze, such as a "pinch click" where the index fingertip and the tip of the thumb touch each other briefly and are released. While the streamer video content is paused, audio communication between the collaborator and the streamer can continue, and the collaborator can continue to highlight locations in the paused streamer video image using other highlight actions or inputs. Another use of a freeze gesture or an alternate gesture such as a swipe or hand pose can be to trigger restart of the streamer's video content on both streamer and collaborator displays.

Restarting of video content for a streamer can be applicable on devices where the streamer is looking at their video stream on their device (e.g., a mobile phone), in contrast to other implementations such as where the streamer is using an augmented reality helmet where the streamer is looking at the actual scene itself and not a camera view of that scene.

Figure 6:
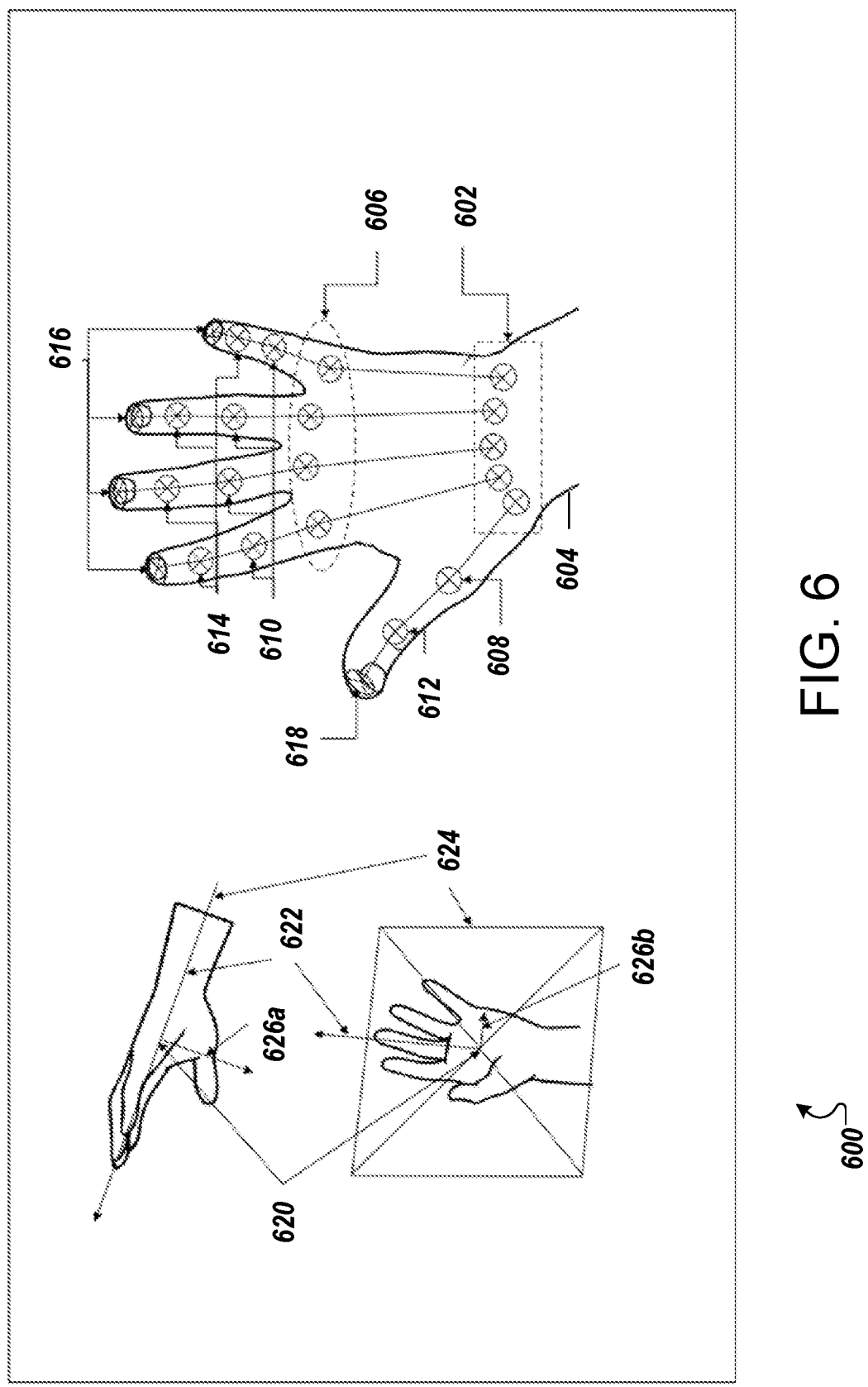
FIG. 6 is a diagram that illustrates tracking points and derived data that can be provided by a hand tracking system.

FIG. 6 is a diagram 600 that illustrates tracking points and derived data that can be provided by a hand tracking system. Detailed hand tracking data provided by hand trackers can include a 3D position of (typically) all the finger and thumb joints of a tracked hand as well as the base joints for each digit where the digit connects to the user's wrist. Additionally, hand trackers can provide "center of the palm" (COP) data that can include an additional 3D position and two vectors. A first vector can define the up direction of the tracked hand from the COP, and a second vector can be a 3D normal vector to the palm at the COP that describes the direction that the palm is facing. If only the joint positions are provided by the hand tracker then an estimation of the COP and the two angles can be calculated using wrist bone positions and the first knuckle of each digit. Given the COP and the 3D normal vector, the distance from the plane in the direction of the normal can be calculated for any point in 3d space. An example of such a calculation is shown below:

```
function distanceFromPlane(palm,normal,tip) {
    let A=normal.x;
    let B=normal.y;
    let C=normal.z;
    let k1=(A*palm.x)+(B*palm.y)+(C*palm.z);
    let k2=(A*tip.x)+(B*tip.y)+(C*tip.z);
    let d=(k2-k1)/Math.sqrt(A*A+B*B+C*C);
    return(d);
}
```

In further detail and as shown in FIG. 6, hand tracking data for the base of the metacarpal bones 602 of a hand 604 can be provided as the base joints for each digit. Data for the top of the metacarpal bones where they intersect with the proximal phalanges of each digit can be provided as other joint data (e.g., as illustrated at 606 and 608). A next joint for the fingers can be at the intersection point of the proximal phalanges with the middle phalanges (e.g., as shown at 610). The thumb has no middle phalanx so there is no corresponding joint on the thumb for that location. Instead, the thumb has a joint where the proximal and distal phalanges intersect (e.g., as shown at 612). A next joint for the fingers can be where the middle and distal phalanges intersect (e.g., as shown at 614). Also provided by the hand tracking system can be data for the tip of the distal phalanges for all digits (e.g., fingertips, as shown at 616 and 618). Data for a center of palm 620 can either provided by the hand tracking system or can be calculated using data for the metacarpal tracking points (e.g., corresponding to 602 and 606). An up vector for the hand can also be calculated if not provided (e.g., as illustrated by 622), and a palm plane 624 and palm normals 626a and 626b can similarly be calculated if required.

Figure 7:
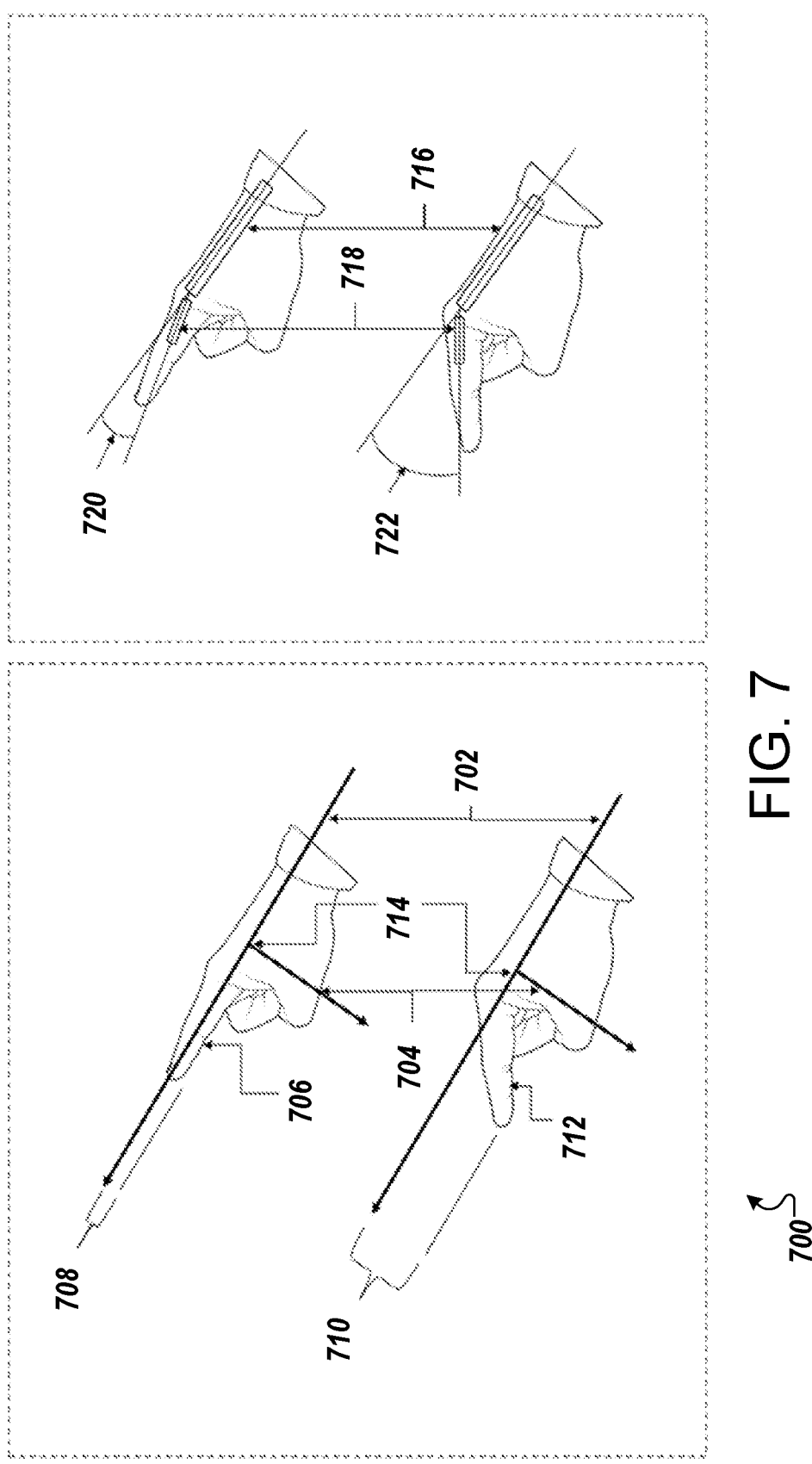
FIG. 7 is a diagram that illustrates two methods for detecting that a finger tap has occurred.

FIG. 7 is a diagram 700 that illustrates different methods for detecting that a finger tap has occurred. In general, different approaches can be used to detect a "finger tap" input. The use of a finger tap can be a common, low-energy, efficient movement for accessing a computer keyboard, an ATM (Automated Teller Machine) screen and many other touch-based interfaces. What makes the finger tap efficient and low energy can be that a finger tap does not require a user's palm or arm to move forwards or backwards as part of the motion. On a computer keyboard, user's palms typically rest on the table or on a palm rest integrated into the keyboard to facilitate extended periods of typing. Accordingly, a typical typing session can involve some wrist lateral rotation and small forward and backward movements of individual fingertips. As another example, at an ATM, some users may use a pointed finger "gun pose" and access ATM buttons by engaging their shoulder and arm to thrust their entire hand forward towards the buttons. Such motions can be viewed as relatively inefficient, but for ATM access there are typically very few button presses required so a downside of slower button pressing and higher muscle use may generally not be a concern. Some users may use a finger tap method on ATMs by holding their hands in midair a few centimeters in front of the keypad and using small wrist motions and index finger taps which can result in a more accurate and rapid experience as compared to the previously-discussed gun pose approach. The streamer/collaborator system discussed herein can be designed to detect relatively efficient user motions such as finger tap gestures (e.g., a hand poised in the air with simple finger movements used to invoke actions).

Finger tapping detection can be applied to an index finger or to any other finger type or thumb. For index finger tapping detection, a distance can be calculated from the tip of the index finger to the palm plane along the normal vector for every frame of hand data and a detection processed can be performed to look for a sequence of frames where the distance from the tip of the index finger to the palm plane is rapidly increasing. As an example, the hand data can be provided at ninety samples per second, or one hand sample every 11.1 ms. A typical finger tap motion can occur in substantially less than a second and can involve movement of more than a centimeter. Accordingly, by calculating the distance of the index fingertip from the palm plane every frame and maintaining a collection of such distances over several frames the system can examine a most recent set of frames to determine if there is a continuous increase in the distance over several frames amounting to more than 1 cm. Such a continuous increase can be determined to correspond to a finger tap gesture. The detection of the finger tap gesture can initiate the rendering of highlight feedback on the collaborator display and corresponding data can be transmitted to the streamer device to enable the streamer device to generate a corresponding highlight feedback on the display of the streamer device at a corresponding fingertip location. A length of the collaborator's index finger can be determined from the hand tracking data, which can enable the system to vary a required motion range of the finger tap for detection relative to smaller or larger hands.

Another approach to detect a finger tap can be to detect changes in the angle of the metacarpal bone of a finger with respect to the proximal phalange of the same finger. A tilting of the finger past the first knuckle generally results in a displacement of the fingertip and such a displacement can be calculated in hand tracking systems that provide finger bone angles instead of absolute positions. As another example, a movement similar to pulling a trigger with the index finger can be detected by detecting an increased angle between the proximal phalange and the middle phalange.

In further detail and as shown in FIG. 7, in a first finger tap detection method, a distance of the finger from a palm plane 702 along a palm forward vector 704 is measured. In a resting position, a fingertip 706 is at a minimal distance 708 from the palm plane 702. In an activated position, a substantially larger distance 710 (e.g., than the minimal distance) can be measured between a fingertip 712 and the palm plane 702. A difference in the distance between the fingertip 712 and the palm plane 702 can be measured across several frames of measurement to detect a finger tap initiation. A center of palm 714 is also displayed for reference. It can be noted that an up vector of the hand is along the palm plane 702.

A second method for detecting a finger tap can be based on using bone angles. In the second method, an index metacarpal 716 can provide a reference angle for an index proximal phalanx 718. The angle between the two bones can be shown to increase as the index finger moves from a rest position angle 720 to an activated position angle 722. A difference between these angles across several frames of measurement can be used to detect a finger tap initiation. A complete finger tap gesture can include the finger returning towards the rest position. The user may not return the finger all of the way to the rest position when completing the gesture, but some higher percentage of the return distance or angle (e.g., greater than 40%) can indicate that the user intention was a complete finger tap. If the user maintains their finger in an activated position (e.g., less than 50% return to the rest position) then the action can be interpreted as a finger press rather than a finger tap and a different onscreen response from the user interface can be initiated. For instance a finger press can represent the start of drawing a line on the screen by moving the hand with the extended finger through the space. The user can then stop the line draw at any time by returning the finger to the rest position or can continue with a new line by raising the finger and then immediately lowering the finger again.

Figure 8:
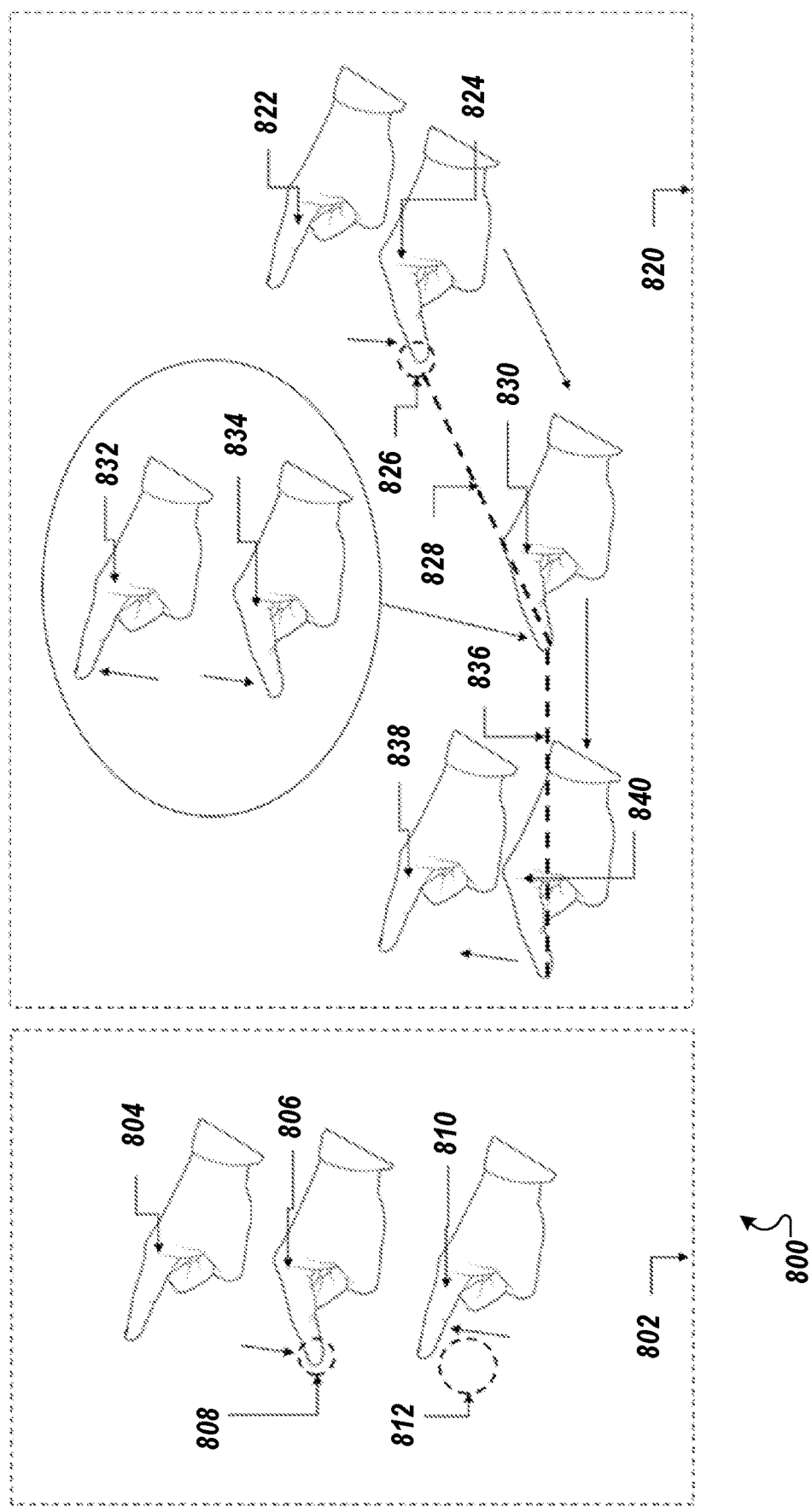
FIG. 8 is a diagram that illustrates two different approaches for using a finger tap gesture in a system.

FIG. 8 is a diagram 800 that illustrates two different approaches for using a finger tap gesture in a system. In a first approach (e.g., shown in an example 802), an index finger starts pointing straight out along the length of the hand in a neutral position (e.g., as shown at 804). The user can drop their index fingertip down (e.g., as shown at 806) by bending the finger at the first knuckle and keeping the rest of the hand stationary. The system can detect the finger motion and can optionally display an indicator 808 on a display at a location that corresponds to the tip of a virtual finger to identify to the user that their motion has been detected and to communicate to the user where a selection point is located. If the user then immediately raises their finger back to the neutral position (e.g., as shown at 810) a user action can be interpreted as a "click" or "select" and the system can optionally draw a larger highlight circle 812 or perform another action at that location, such as activating a user interface button or other activity. If the action is performed on streaming video or on a 3D model, then the direction of the finger tap can influence the rendered highlight by angling it to reflect the 3D position and angle of the finger motion to further enhance a feeling of presence in the scene.

Other annotations can be rendered with respect to finger tracking. For instance, in certain situations where a camera image is paused or a fixed camera position is being used by the streamer, it may be useful to annotate the streamer feed in additional ways. As an example, if the collaborator wanted to draw a series of lines on the streamer and collaborator displays to outline an area or to instruct the streamer in some way, while this could be facilitated with a mouse, a more natural approach may be to enable drawing using a finger of the collaborator. One method to enable finger drawing is to detect an index finger performing a start of a "tap" gesture but then remaining in a forward position. In response to detecting a pausing of the finger for a short (e.g., less than a threshold) period of time, a start point can be drawn to show the beginning of an annotation. The collaborator can then move their hand around the display, and in response a line can be drawn from the start point to the collaborator's current fingertip position. The system can also detect a restoring of the collaborator's finger to a neutral position followed by a rapid moving of the finger forward again. In response to such detection an extra point can be added and the system can enable the collaborator to start a drawing of a new line in a different direction at any time. The collaborator returning to a neutral finger position can be used to signal that they have completed an annotation. A means of saving the annotation and of clearing the annotation can also be implemented using other hand poses or actions.

In further detail and as shown in FIG. 8, in a second approach (e.g., shown in an example 820) starts in a same manner as the click action shown in the example 802. That is, the index finger starts straight out along the length of the hand in a neutral position (e.g., as shown at 822). The user can drop their index fingertip down (e.g., as shown at 824) by bending the finger at the first knuckle and keeping the rest of the hand stationary. The system can detect the finger motion and optionally draw an indicator 826 on a display at a location that corresponds to the tip of a virtual finger to identify to the user that their motion has been detected and to communicate to the user where a selection point is located. If the user keeps their fingertip in the lowered position, then they can move their hand from the initial selection point and dynamically draw a line 828 from their initial selection point to a current fingertip location 830. If the user wants to change directions or otherwise continue the line, they can rapidly raise the finger to neutral (e.g., as shown at 832) and lower the finger (e.g., as shown at 834) to perform a select action once again and continue drawing a new line 836 from the current location. If the user wants to stop drawing at any time, then they can return their finger to a neutral position (e.g., as shown at 838) and the line can be completed at the current location (e.g., at shown at 840). Note that the hand itself can be moving in three dimensions, and hence the lines created with this technique can have 3D coordinate positions.

Other hand poses or gestures other than finger taps can be supported. For example, various types of hand poses can be used to pause and/or restart the streamer's video. For instance, a flat open palm with fingers extended and spread apart pose can signal "stop" in different types of systems and the system described herein can detect such a natural gesture to enable the collaborator to pause the video. For the system to detect this pose, the fingers can be aligned close to the palm plane and be spread apart. The system can detect this pose by testing the location of the tip of each finger relative to the plane and testing that the fingertips are themselves not touching each other. To restart the video, the system can detect a hand swipe across the tracking region. In some cases, a detection of a repeat of the "stop" gesture might be utilized to minimize the number of gestures required by the collaborator. While the video is stopped, the collaborator can signal for the system to zoom into parts of the paused image using either one or two hands in a pinch gesture. The pinch gesture can be detected by detecting that the index fingertip location and the thumb tip location are within a threshold distance to each other yet extended from the palm. The system can enhance the accuracy of this form of detection by ensuring that each joint of the index finger is getting further from the palm plane. If the collaborator uses a single finger gesture to pinch, the collaborator can then perform a "pulling" gesture (e.g., pulling the paused video image towards themselves) which can signal the system to zoom into the image using the pinched location as the center of a zoom region. The collaborator can also request that the system zoom back out by moving their pinch further into the tracking region. Such motions can be detected because the hand tracker can track the hand in 3D. Such 3D tracking can provide an advantage over conventional touch displays that require two fingertips to resize or zoom into an image. The system can also enable emulation of a two-fingertips approach by detecting a pinching by the collaborator with both hands and calculating the space between the two pinch locations as a determined zoom amount.

Another interaction that can be detected in addition (or alternatively) to a finger tap can be a "grab" action. For example, the collaborator can bend multiple fingers including the thumb in a grabbing action in order to trigger different types of annotations or interactions. The "grab" action can be altered by changing the spacing between the fingertips, which can result, for instance in a varying of the size of an annotation. For example, the collaborator may want to augment something (e.g., a design object) in the streamer's video, for instance for an art use case. The collaborator can move their hand and vary the size of an opening created by the tips of their fingers in order to paint in 3D, sculpt in 3D, or teach or train in a unique way, to name a few examples.

In general, various types of hands-gesture alphabets and pose determination approaches can be supported. In a system where hands are being used to interact with a user interface, the system can be configured to understand hand poses and hand actions as commands making up an alphabet for a broad range of tasks. For such an alphabet to be effective, the system can be configured such that each pose and/or action can be clearly differentiated from any other pose or action, based on hand tracking data. As described above, typical hand tracking data may include five 3D joint locations (e.g., X, Y, Z coordinates) for each of the fingers of the hand and four 3D locations for the joints of the thumb, for a total set of nineteen tracking points. A base joint for any digit can be in the wrist, with the first knuckle of each digit being at the other end of a metacarpal bone that starts at the wrist and forms the back of the hand. The remaining bones of each digit can be referred to as phalanges and correspond to what is commonly known as finger bones.

Many systems use machine learning to differentiate between poses, however there are heuristic methods based on the joint positions that require far less processing for a specified collection of hand poses. The center of the palm can be derived by averaging the positions of the joints at both ends of the metacarpal bones of the fingers. The center of the palm can be useful for helping to determine certain hand poses in a heuristic system. In addition, a palm plane, palm-up vector, and palm-normal vector can be determined from those same joint positions and can also useful for determining certain hand poses heuristically. Calculating the angle at each joint can provide still more useful information for heuristic analysis. As an example of a heuristic, the system can determine that a finger is extended if each phalange joint is further away from the center of the palm. Alternatively, the system can determine that a finger is straight and extended by evaluating the angles at each joint or by evaluating the distance from the palm plane at each joint. A hand in a fist pose can result in a fingertip distance to the center of palm being shorter than the other joints of the fingers. Alternatively, if the system determines that the sum of the angles of each of the finger joints is greater than one hundred eighty degrees the system can determine that the finger is bent into a fist position.

For the interactions used with the system, detection of a finger tap can involve detection of a combination of a hand pose with a motion. Such combination detection can prevent an accidental triggering of a highlight. A collaborator using a series of finger taps with movement of the hand can enable drawing of connected lines as explained above. The detection of a hand in a "grab" pose with a space between the fingers can allow a collaborator to draw in a freeform manner in the virtual space on a streamer's view. In some cases, a 3D object can be rendered using the space between the fingers as a guide. Since the hand positions themselves are 3D, information about the spacing of the fingertips combined with a detected motion through space can allow the creation of sculptural objects or tubes of varying dimension. Detecting a pinch for zooming in and around the space can be done in a number of ways, but one heuristic that can be used is a proximity of the index fingertip to the thumb fingertip, both in an extended (though not necessarily straight) pose.

Different approaches can be used to map 3D hand information to the streamer's view. For example, when creating a 3D view that displays a tracked hand, the system can first place a virtual scene camera based on where the eyes of the collaborator would be. A goal can be to have a virtual hand within the view to appear to be aligned in orientation and position with the actual collaborator hand as seen by the collaborator. If the collaborator is using a virtual reality (VR) headset for the current collaboration session, then the hand tracking system on a VR headset can automatically provide "headset relative" hand position data by default. For a desktop scenario, the hand tracking device may be placed on a desk in front of the collaborator or mounted at the top or bottom of a display monitor. In desktop scenarios, the data provided by the tracking system may be relative to the tracking device itself and the tracking system data may be transformed to positions that are relative to the collaborator's view.

In some cases, an aspect ratio and orientations of the collaborator and streamer displays may not be aligned. For instance, in some scenarios, a streamer may be using their mobile phone in portrait mode and streaming 9:16 aspect ratio video content to a collaborator desktop device that is in landscape mode. Processing can be performed so that a superimposed collaborator hand image is drawn at a same location and size on both the collaborator and streamer displays to ensure that what the collaborator is pointing to or interacting with appears the same for both the streamer and the collaborator. To achieve this same similar view, 3D camera and viewing frustums can be matched on both displays relative to the streamer's video. For example, when the collaborator device receives the video stream from the streamer, the collaborator device can first determine a "best fit" for the video stream on the collaborator display. For the example of a portrait mode streamer and a landscape mode collaborator, the video stream from the streamer can be displayed vertically within a landscape view of the collaborator. As an example, the remote stream from the streamer can be scaled to be an exact height of the collaborator device's display window with a width calculated using the streamer device's aspect ratio. In an example of a 9:16 stream, if the height of the collaborator display window is h pixels, then the displayed height of the stream can be h and the displayed width (w) of the stream can be $w=h*9/16$. This calculated height and width can also be used to initiate a viewing frustum of a 3D superimposed layer and can either be done as a default on the streamer side based on the streamer device aspect ratio or can be sent as a data message from the collaborator device to the streamer device so that the respective 3D frustums can be matched. The approach of sending the 3D frustum data message can enable the collaborator to choose to "zoom in" to a smaller region of the streamer's video if desired, allowing finer hand control over a smaller region of the video. The data required to set the 3D camera and viewing frustum can include a virtual camera position, view direction and up vector, the near and far clip plane distances from the virtual camera position, the vertical field of view of the camera expressed in degrees (or radians) and the aspect ratio of the view itself.

Different approaches can be used for generating a 3D scene from the streamer's video. For example, modern mobile phones and augmented reality headsets can have the capability to dynamically create a 3D view of an environment as those devices are moved around a space. Depth cameras can be included on certain mobile phones, and alternatively software techniques like SLAM (Simultaneous Localization and Mapping) may be implemented on mobile phones. SLAM processing can provide knowledge of the location of the streamer's camera as well as the physical distances between the camera of the streamer and various surfaces in the streamer's environment. Such data can enable enhanced features for collaborator interactions. As an example, if a streamer device is streaming video showing an electrical panel or tabletop or other surface that was close to the stream, then an immersive approach can be used where the hand of the collaborator appears to be clipped or to disappear if the collaborator reaches out too far and therefore went virtually "through" that surface. In addition, if the area of the streamer's environment is a relatively larger space, then the collaborator's hand reach can be mapped to the total distance available so that the collaborator can virtually reach much further into the streamer's view than a normal actual reach would allow. Another approach can be used such that when a highlight selection happens, a highlight position can be projected to a closest object in the scene at that screen location.

In some cases, there may be privacy issues that prevent a live video from being streamed while software for SLAM processing is running on a streamer's device. In such cases, a streamer's mobile phone orientation and position data can be sent to the collaborator, and SLAM functionality can be added to the collaborator device to allow the collaborator device to remotely build the 3D scene. This would allow the collaborator device to use the data from the 3D scene to alter the location and clipping of the collaborator's virtual hands within the scene. Data regarding the location and clipping of the collaborator's virtual hands can be transmitted to the streamer device in addition to basic hand tracking data. Another approach can include a cloud server-based application dynamically creating a 3D scene and sharing 3D scene data both the streamer device and the collaborator device. As another example, a separate codebase can be used to run SLAM on the streamer's device and clipping of the hand calculations can be performed on the streamer device itself, and in some cases, corresponding 3D data can be shared with the collaborator device. An advantage to this technique is that the collaborator device can create a dynamic 3D reconstruction of the streamer's environment with textures taken from the live video feed. The collaborator could then choose to share the created 3D environment with the streamer, allowing the collaborator to show and interact with a different part of the room or environment than where the streamer is currently located. An example use case can be a crime scene where a remote specialist is acting as collaborator and an on-site streamer is walking around the crime scene providing the source for the 3D environment. If the collaborator wanted additional detail at some location in the room, then the collaborator can show the streamer that position from the 3D model and the streamer can then go closer to that area so that additional texture details can be filled in as desired. Other approaches that include storing the 3D model for later interaction can enable various other capabilities and use cases.

FIG. 9A is a flowchart of an example method 900 for collaboration between a streamer computing device and a collaborator computing device.

Streaming images taken by a streamer computing device are generated by the streamer computing device (902).

A streamer user interface that includes the generated streaming images is generated and provided, for output by the streamer computing device (904). The streamer computing device can be a mobile device, such as a smart phone, a wearable virtual reality device, or some other type of mobile device. The streaming images can include the user of the streamer computing device (e.g., the streaming images can be captured using a front-facing camera of the streamer computing device. As another example, the streaming images can be captured by a rear-facing camera of the streamer computing device (e.g., the streaming images may be of a location of the streamer computing device without including the user of the streamer computing device. In some cases, the streaming images can be of a display screen of the streamer computing device (e.g., the streamer computing device can be a desktop computing device).

The streaming images are transmitted, by the streamer computing device, to the collaborator computing device (906).

Hand tracking data that was generated by the collaborator computing device is received by the streamer computing device (908).

The streamer user interface is updated, by the streamer computing device, to include a representation of the hand tracking data and the streaming images (910). In some implementations, received hand tracking data is mapped to the streamer user interface to generate mapped hand tracking data and the representation of the hand tracking data can be generated based on the mapped hand tracking data. In some implementations, audio/video data of the collaborator is received from the collaborator computing device. The streamer user interface can be updated to present the audio/video data of the collaborator. In some implementations, second hand tracking data can be received from a second collaborator computing device of a second collaborator who is different from the user of the collaborator computing device. The streamer user interface can be updated to include a second representation, of the second hand tracking data.

FIG. 9B is a flowchart of an example method 920 for collaboration between a collaborator computing device and a streamer computing device. The collaborator computing device can be one of various types of computing devices, such as a mobile device, a wearable virtual reality device, a desktop device, or some other type of computing device.

Streaming images taken by a streamer computing device are received by the collaborator computing device (922). In some implementations, the images taken for the user of the streamer computing device are taken at a location that is remote from the collaborator computing device. In some implementations, the streaming images include different sets of images, where each set of images is taken by a different camera of multiple cameras at a location of the streamer computing device.

A collaborator user interface that includes the received streaming images is generated and provided, for output by the collaborator computing device (924). The collaborator user interface can be used to display streaming images taken for a location that is remote from the collaborator computing device. When the streaming images include different sets of images (e.g., taken by different cameras at the location of the streamer computing device), generating the collaborator user interface can involve including, in the collaborator user interface, a separate portion of the collaborator user interface for each set of images of the different sets of images.

Hand tracking data for a user of the collaborator computing device is received by the collaborator computing device (926). The hand tracking data can be received by a hand tracking device that is separate from the collaborator computing device. As another example, the hand tracking data can be generated by the collaborator computing device (e.g., when the collaborator computing device is a virtual reality device).

The collaborator user interface is updated, by the collaborator computing device, to include a representation of the hand tracking data (928). When the collaborator user interface includes multiple portions, a selection can be received of a first portion of the collaborator user interface and the first portion of the collaborator user interface can be updated to include the representation of the hand tracking data.

The hand tracking data is transmitted, by the collaborator computing device, to the streamer computing device for inclusion on a streamer user interface that is generated and provided for output by the streamer computing device (930). For example, the hand tracking data can be sent to the streamer computing device that is at a location that is remote from the collaborator computing device. In some implementations, the collaborator computing device captures audio/video data of the user of the collaborator computing device and transmits the audio/video data to the streamer computing device. When the collaborator user interface includes multiple portions, an indication of a selected portion can be transmitted to the streamer computing device.

The system can have various types of implementations. For instance, a first example system can include a local user (e.g., user A) with a device capable of overlaying graphics on the local view and streaming that local view to a remote user (e.g., user B). The remote user B can have a device capable of receiving and displaying the stream of the view from local user A and overlaying graphics on the view and transmitting position data for overlaid graphics to the device of the local user A. The user B can use a hand tracking device to provide detailed hand pose and position data to transmit to the user A. User A's device can render one or more 3D graphic hands representing user B's hand pose and position relative to user A's local view.

A second example system can include a first user (e.g. user A) with a device capable of overlaying graphics on their view and streaming that view to a second user (e.g., user B). The second user B can have a device capable of receiving and displaying the stream of the view from the first user A and overlaying graphics on the view and transmitting position data for overlaid graphics to the first user A. The second user B can use a hand tracking device to provide hand pose and position data to draw a representation of one or more hands superimposed on the streaming view of the first user A and transmit the hand pose and position data to the device of first user A. The device of the first user can render one or more hands representing the second user B's hand pose and position.

A third example system can include a local user (e.g., user A) with a device capable of overlaying graphics on a local view, streaming that local view to a device of remote user (e.g., user B) and sending 3D position and orientation data for that streaming view to the device of the user B. The remote user B can have a device capable of receiving and displaying the stream of the view from the local user A, overlaying graphics on the view, building a real time SLAM-based view of user A's local world, and transmitting position data for overlaid graphics to the device of the local user A. The user B can use a hand tracking device to provide detailed hand pose and position data to draw a representation of one or more hands superimposed on the derived SLAM-based view of the user A. The device of the user B can transmit the detailed hand pose and position data to the device of user A. User A's device can render one or more 3D graphic hands representing user B's hand pose and position relative to user A's local view.

A fourth example system can include a local user (e.g., user A) with a device capable of overlaying graphics on a local view, streaming that local view to a server, and sending 3D position and orientation data for that streaming view to the server. The server can be capable of building a SLAM-based world using the video stream and position and orientation data from received from the user A and streaming any portion of that view to a device of a remote user (e.g., user B). The remote user B can have a device capable of receiving and displaying the stream of the view from the server, overlaying graphics on the view, and transmitting position data for overlaid graphics to the device of the local user A. The user B can use a hand tracking device to provide detailed hand pose and position data to draw a representation of one or more hands superimposed on the server view of user A. The device of user B can transmit the detailed hand pose and position data to the device of user A. The device of user A can render one or more 3D graphic hands representing user B's hand pose and position relative to user A's local view.

A fifth example system can include a hand tracking device that can track data for a user whose hand enters a tracking region of the hand tracking device. The tracking device can provide tracking data from which a given finger's deflection angle of the proximal phalanx relative to the metacarpal bone can be calculated. Detection of the user's deflection of the proximal phalanx can be used to initiate an action in the user interface of the system.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine readable storage device, a machine readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by a collaborator computing device, streaming images taken by a streamer computing device, and depth data for an environment of the streamer computing device;
   generating and providing, for output by the collaborator computing device, a collaborator user interface, the collaborator user interface including the received streaming images;
   receiving, by the collaborator computing device, hand tracking data based on a user of the collaborator computing device reaching into a hand tracking area;

determining a total distance available for virtual reaches into the environment of the streamer computing device based on the depth data;

determining a virtual reach distance for the user of the collaborator computing device based at least on (i) a location of the reach of the user of the collaborator computing device into the hand tracking area, and (ii) the total distance available for virtual reaches into the environment of the streamer computing device;

updating, by the collaborator computing device, the collaborator user interface to include a representation of the hand tracking data, positioned based on the virtual reach distance; and transmitting, by the collaborator computing device, the hand tracking data and the virtual reach distance to the streamer computing device for inclusion on a streamer user interface that is generated and provided for output by the streamer computing device.

2. The computer-implemented method of claim 1, wherein the collaborator computing device is a virtual reality computing device and the hand tracking data is generated by the collaborator computing device.

3. The computer-implemented method of claim 1, wherein:

the streaming images are taken at a location that is remote from the collaborator computing device;

the collaborator user interface can display the streaming images taken at the location that is remote from the collaborator computing device;

the hand tracking data is transmitted to the streamer computing device that is at the location that is remote from the collaborator computing device; and the streamer user interface can display the streaming images taken at the location that is remote from the collaborator computing device along with a representation of the hand tracking data.

4. The computer-implemented method of claim 1, wherein the hand tracking data is generated by a hand tracking device that is separate from the collaborator computing device.

5. The computer-implemented method of claim 1, further comprising:

capturing, by the collaborator computing device, audio/video data of the user of the collaborator computing device; and transmitting, by the collaborator computing device and to the streamer computing device, the audio/video data of the user of the collaborator computing device.

6. The computer-implemented method of claim 1, wherein the streaming images include different sets of images, wherein each set of images is taken by a different camera.

7. The computer-implemented method of claim 6, wherein generating the collaborator user interface comprises including, in the collaborator user interface, a separate portion of the collaborator user interface for each set of images of the different sets of images.

8. The computer-implemented method of claim 7, further comprising:

receiving, by the collaborator computing device, a selection of a first portion of the collaborator user interface corresponding to a first set of images taken by a first camera;

updating, by the collaborator computing device, the first portion of the collaborator user interface to include the representation of the hand tracking data; and transmitting, by the collaborator computing device and to the streamer computing device, in association with the transmitting of the hand tracking data, an indication of the selection of the first portion.

9. The computer-implemented method of claim 1, further comprising:

receiving, by the collaborator computing device, second streaming images taken by a second streamer computing device;

updating, by the collaborator computing device, the collaborator user interface to include the streaming images in a first portion of the collaborator user interface and the second streaming images in a second portion of the collaborator user interface;

receiving, by the collaborator computing device, a selection of the second portion of the collaborator user interface;

updating, by the collaborator computing device, the second portion of the collaborator user interface, to include a representation of the hand tracking data; and transmitting, by the collaborator computing device, the hand tracking data to the second streamer computing device.

10. A computer-implemented method comprising:

generating, by a streamer computing device, streaming images taken by the streamer computing device;

generating, by the streamer computing device, depth data for an environment of the streamer computing device;

generating and providing, for output by the streamer computing device, a streamer user interface, the streamer user interface including the generated streaming images;

transmitting, by the streamer computing device, the streaming images and the depth data to the collaborator computing device;

receiving, by the streamer computing device, hand tracking data and a virtual reach distance for a user of the collaborator computing device that was generated by the collaborator computing device, wherein the virtual reach distance is determined based at least on the depth data for the environment of the streamer computing device; and updating, by the streamer computing device, the streamer user interface to include a representation of the hand tracking data, positioned based on the virtual reach distance, and the streaming images.

11. The computer-implemented method of claim 10, wherein the streamer computing device is a mobile device.

12. The computer-implemented method of claim 11, wherein the streamer computing device is a virtual reality device.

13. The computer-implemented method of claim 11, wherein the streaming images are of the user of the streamer computing device captured using a front-facing camera of the streamer computing device.

14. The computer-implemented method of claim 11, wherein the streaming images are captured using a rear-facing camera of the streamer computing device.

15. The computer-implemented method of claim 10, wherein the streaming images are of a display screen of the streamer computing device.

16. The computer-implemented method of claim 10, further comprising mapping, by the streamer computing device, received hand tracking data to the streamer user interface to generate mapped hand tracking data, and wherein updating the streamer user interface to include the representation of the hand tracking data comprises generating the representation of the hand tracking data based on the mapped hand tracking data.

17. The computer-implemented method of claim 10, further comprising:
- detecting, by the streamer computing device, a finger tap gesture from the hand tracking data;
- determining, by the streamer computing device, a location within the streamer user interface that corresponds to the finger tap gesture; and
- updating, by the streamer computing device, the streamer user interface to include an indicator of the finger tap gesture at the location within the streamer user interface that corresponds to the finger tap gesture.

18. The computer-implemented method of claim 10, further comprising:
- detecting, by the streamer computing device, a freeze-stream gesture from the hand tracking data;
- updating, by the streamer computing device, the streamer user interface to display a single image of the streaming images;
- receiving, by the streamer computing device, updated hand tracking data; and
- displaying, by the streamer computing device and in the streamer user interface on the single image, an updated representation of hand tracking data, based on the updated hand tracking data.

19. The computer-implemented method of claim 10, further comprising:
- receiving, by the streamer computing device and from the collaborator computing device, audio/video data of the user of the collaborator computing device; and
- updating, by the streamer computing device, the streamer user interface to present the audio/video data of the user of the collaborator computing device.

20. A computer-implemented method comprising:
- generating, by a streamer computing device, streaming images taken by the streamer computing device;
- generating and providing, for output by the streamer computing device, a streamer user interface, the streamer user interface including the streaming images as video content;
- transmitting, by the streamer computing device, the streaming images to the collaborator computing device;
- receiving, by the streamer computing device, hand tracking data for a user of the collaborator computing device that was generated by the collaborator computing device;
- detecting, by the streamer computing device, a freeze-stream gesture from the hand tracking data that was generated by the collaborator computing device;
- updating, by the streamer computing device, the streamer user interface to pause the video content by displaying a single, still image of the streaming images without displaying any other of the streaming images;
- receiving, by the streamer computing device, updated hand tracking data that was generated by the collaborator computing device; and
- displaying, by the streamer computing device and in the streamer user interface and overlaid on the single, still image of the streaming image, an updated representation of hand tracking data, based on the updated hand tracking data.

* * * * *